United States Patent

[11] 3,551,775

[72] Inventor Mohammed Safiuddin
 Buffalo, N.Y.
[21] Appl. No. 759,276
[22] Filed Sept. 12, 1968
[45] Patented Dec. 29, 1970
[73] Assignee Westinghouse Electric Corporation
 Pittsburgh, Pa.
 a corporation of Pennsylvania

[54] CURRENT LIMIT PROTECTION FOR INVIDUAL MOTORS FOR A MULTIMOTOR DRIVE SYSTEM
 8 Claims, 3 Drawing Figs.
[52] U.S. Cl..................................................... 318/434,
 318/71, 318/98, 318/476
[51] Int. Cl...................................................... H02p 7/74
[50] Field of Search............................................ 318/71, 98,
 99, 112, 434, 476, 144

[56] References Cited
UNITED STATES PATENTS
3,155,891 11/1964 Rosa I.................... 318/144X
3,189,807 6/1965 Rosa II................... 318/144X
3,284,688 11/1966 Black..................... 318/513X Primary Examiner—Oris L. Rader
Assistant Examiner—Alfred G. Collins
Attorneys—F. H. Henson and R. G. Brodahl ABSTRACT: Described is a motor control system for a plurality of motors employing current limit protection, wherein the current through each motor is sensed and if the current through any motor should exceed a predetermined maximum limit, a signal is fed back to a voltage adjustable limiter for the outer voltage or speed controller for the motors.

CURRENT LIMIT PROTECTION FOR INVIDUAL MOTORS FOR A MULTIMOTOR DRIVE SYSTEM

BACKGROUND OF THE INVENTION

Motor-control systems for a plurality of thyristor-powered direct current motors usually include an outer voltage or speed controller which feeds into a current controller in a multiloop regulator system. The current controller, responsive to current flowing through the motors, can be used to directly control the firing circuits for the thyristors, or it can feed into an inner voltage controller which, in turn, regulates the firing circuits.

Such systems require current limit protection for individual motors as well as the thyristor power supply. One of the methods presently employed for this purpose consists of an auctioneering circuit which selects the largest of the motor current signals and feeds it into the current controller through a dead-band circuit. Under current limit conditions, if any one of the motors exceeds its current limit value, the auctioneering sensor provides an additional current feedback to the controller, thus reducing the output of the thyristor power supply.

The difficulty with circuits which feed back to the current controller is that for the circuit to have the desired influence on the system, the outer voltage or speed controller should be saturated. Otherwise, the speed or voltage feedback will counteract and raise the output of the speed controller to overcome this additional current feedback. Thus, no change will appear in the thyristor power supply output, or the output might oscillate due to the interaction of these two regulators. Furthermore, the additional current feedback, when it appears in the system, changes the dynamics of the current loop.

SUMMARY OF THE INVENTION

As an overall object, the present invention seeks to provide an improved current limit protection for a multimotor drive system which overcomes the disadvantages of the system where additional current feedback to the current controller is employed for this protection.

More specifically, an object of the invention is to provide an improved current limit protection for a multimotor drive system wherein the current through any motor, when it exceeds a predetermined maximum limit, causes a signal to be fed into a voltage adjustable limiter connected across the speed controller rather than the current controller. In this manner, each individual motor is protected against excessive currents by reducing the reference to the current regulator which reduces the total current of the thyristor power supply.

In accordance with the invention, a motor-control system for a plurality of direct current motors connected to a common thyristor power supply is provided including a voltage reference controller having an adjustable maximum output and to which a speed control signal is applied. Coupled to the output of the voltage reference controller is a current controller responsive to current through the motors; while means are provided for coupling the output from the current controller to the thyristor firing circuitry. An auctioneering sensor means, responsive to current flow through the motors, produces an output control signal when current through any one of the motors exceeds a predetermined maximum limit. This output-control signal, in one illustrative embodiment of the invention, is applied to the adjustable voltage limiter of the voltage reference controller to reduce its maximum output.

With this arrangement, each individual motor is protected against excessive currents by limiting the output of the voltage reference controller, thereby reducing the reference to the current regulator which reduces the total current of the thyristor power supply. When tapered current limit is required in the regulator, the same adjustable limiter can be used to reduce the limiting voltage of the controller as a function of the thyristor power supply voltage. In this case, the input to the voltage adjustable limiter is fed through a switching circuit such that either of two inputs, current or voltage, can reduce the limiting voltage of the controller.

The above and other objects and features of the invention will become apparent from the following detailed description taken in connection with the accompanying drawings which form a part of this specification, and in which:

BRIEF DESCRIPTION OF DRAWINGS

FIG. 3 comprises a graph illustrating the current limit effect of the circuits of FIGS. 1 and 2.

DESCRIPTION OF PREFERRED EMBODIMENT

Figure 1:
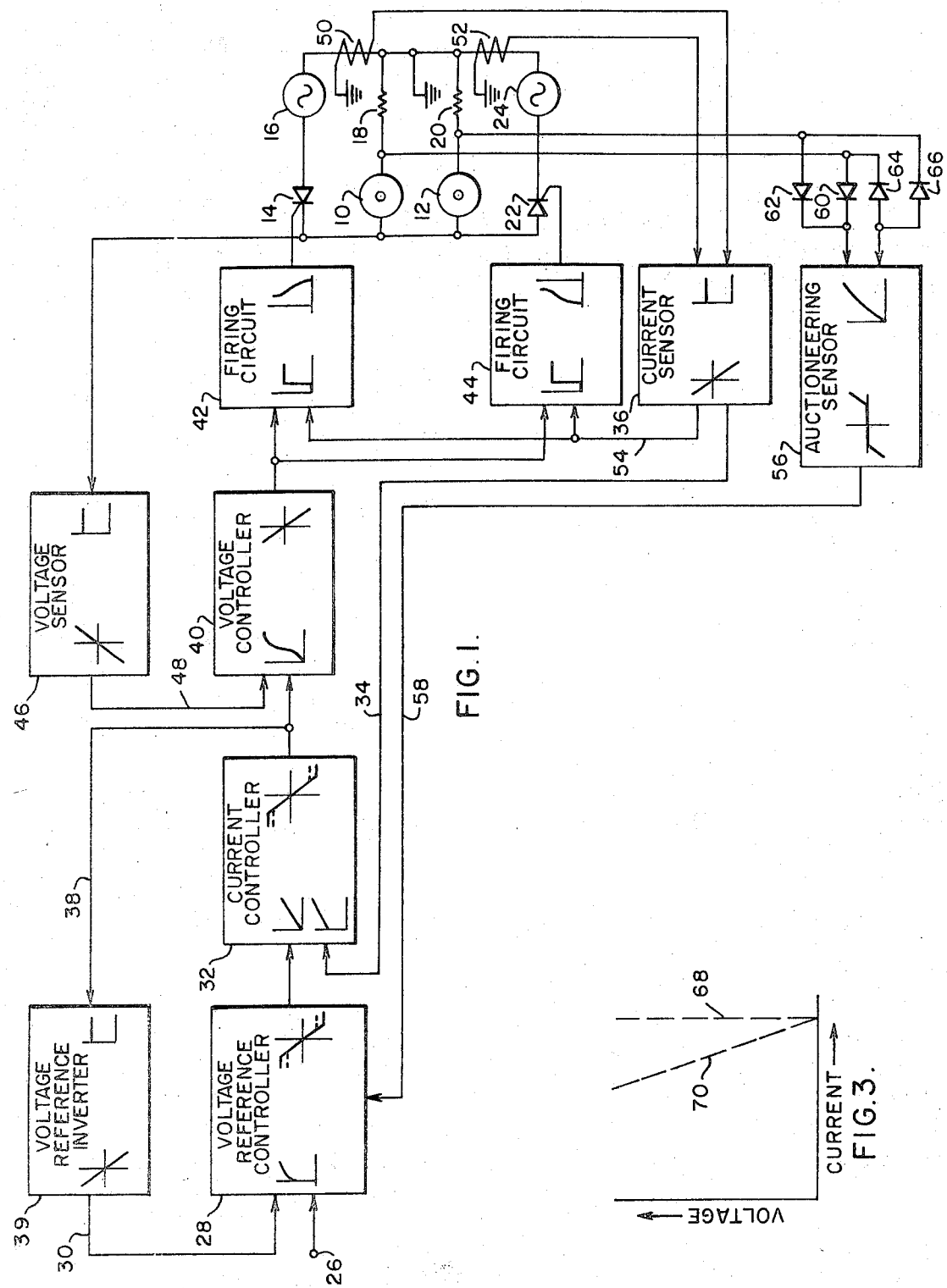
FIG. 1 is a block diagram of one embodiment of the invention.

With reference now to the drawings, and particularly to FIG. 1, a multimotor control system is shown including motor armatures 10 and 12 connected in parallel between forward and reverse thyristor power supplies. The forward thyristor supply is symbolically shown herein as a single thyristor 14 in a series with a source of alternating current voltage 16. One terminal of the source 16 is connected through resistor 18 to one terminal of the motor armature 10; and through resistor 20 to one terminal of the motor armature 12. The other terminals of the motor armatures 10 and 12 are connected to the cathode of the thyristor 14.

In a similar manner, a reverse thyristor 22 is provided in series with a source of alternating current voltage 24, the series combination being connected across the motor armatures 10 and 12.

In the blocks shown in FIG. 1, the curve on the input side of the block represents the time response of the circuit to a step input; while the curve on the output side represents the linearity of the circuit. The speed reference signal for the system is applied to input terminal 26 and thence to a voltage reference controller 28. As shown, the time response of a step input to the controller 28 is an abrupt increase which then tapers off. The gain of the circuit gradually increases in the positive or negative direction, depending upon the polarity of the input signal, until it reaches a point of saturation. Furthermore, the point of saturation can be varied upwardly or downwardly as shown, for example, by the dotted lines on the gain curve for circuit 28.

The inputs to the voltage reference controller are both the reference voltage on terminal 26 and a feedback voltage on lead 30 representing motor speed. When the voltages on lead 30 and terminal 26 do not cancel, the voltage controller 28 integrates the difference and the output increases until the saturation limits are reached.

The output from the voltage controller 28 is applied as one input to a current controller 32. The other input to the current controller 32 is a feedback current on lead 34 from a current sensor 36, hereinafter described in detail. When the two inputs to the current controller 32 do not cancel each other, the current controller integrates the difference and its output changes the motor current until the difference is zero. Thus, the motor current is made to match the current indicated by the voltage controller. Note that the output gain curve of the current controller saturates at positive and negative levels, in a manner similar to the voltage reference controller 28. Thus, the current output of sensor 36 can get only as large as the voltage controller output which is limited by saturation. When the voltage controller is in saturation, its output is constant and, therefore, so is the current. The output of the current controller 32 is connected via lead 38 to a voltage reference inverter 39 which, in turn, produces the signal on lead 30.

The output of the current controller is applied to an inner loop voltage controller 40; and the output of the voltage controller, which gradually increases as the signal from circuit 32 increases, is applied to two thyristor firing circuits 42 and 44. Firing circuit 42 is utilized to fire the thyristors, symbolically represented by the element 14, and regulate the power supplied to the armature 10 in accordance with phase commutation techniques. Similarly, the firing circuit 44 is utilized to fire the thyristors, symbolically represented by the element 22.

The voltage across the motor armatures 10 and 12 is sensed by a voltage sensor circuit 46; and the output of the voltage sensor, which increases in the positive or negative direction as motor voltage increases, is applied via lead 48 to the voltage controller 40. Here again, when the two inputs to the voltage controller do not cancel each other, the controller amplifies the difference and its output changes the firing angle of the thyristors 14 and 22 until the difference is minimized.

Motor current is sensed by means of current transformers 50 and 52 on the AC side of the power supply and applied to the input of the current sensor 36. The current sensor 36 is provided with a second output on lead 54 which provides gate pulse suppression to the firing circuits 42 and 44.

The system thus far described is, for the most part, conventional. The present invention is concerned with an auctioneering sensor 56 which applies a signal on lead 58 to the voltage reference controller 28 to vary the saturation limit of the controller. The current through the motor armatures 10 and 12 is sensed as a voltage across resistor 18 or 20; and if it is a positive voltage it is applied via diodes 60 and 62 to the input of the auctioneering sensor 56. On the other hand, if the voltage sensed is negative, it is applied to the input of the auctioneering sensor 56 through diodes 64 and 66. As shown, the output curve of the sensor 56 is such that the output remains at substantially zero until a predetermined limit is reached in the positive or negative direction, whereupon the output increases sharply. As the output does increase, it varies the saturation limit of the output of the voltage reference controller 28.

The auctioneering sensor 56 may be of the type manufactured by Westinghouse Electric Corporation, Systems Control Division, Buffalo, New York and described in Westinghouse Instruction Leaflet I.L. 16-800-69A (1966). Essentially, it consists of an amplifier, either a magnetic amplifier or an operational amplifier, together with an input offset circuit which insures that the output of the amplifier will be zero until the current signal exceeds a predetermined magnitude as shown by the output curve of circuit 56 in FIG. 1. The input offset circuit may comprise a pair of Zener diodes, one of which will break down in response to an overcurrent condition under motoring conditions the other of which will break down under regeneration conditions. As long as the current through any one of the motors is not great enough to cause the Zener diode to break down, the output of the circuit is zero. However, when the Zener diode breakdown point is reached, the output of the auctioneering sensor increases linearly with one polarity during motoring conditions and with the other polarity during regeneration conditions. As a substitute for the Zener diodes, back-biased diodes can be used equally well.

With reference to FIG. 3, the broken line 68 represents current limit achieved with the system of FIG. 1; and it will be noted that it is an essentially straight line and constant for all voltages. However, in certain cases, it may be desirable to have a tapered current limit such as that indicated by the broken line 70 whereby the maximum permissible current decreases as voltage increases, thereby permitting maximum current and torque at low voltages and speeds while gradually reducing the maximum current as the voltage and speed increase.

Figure 2:
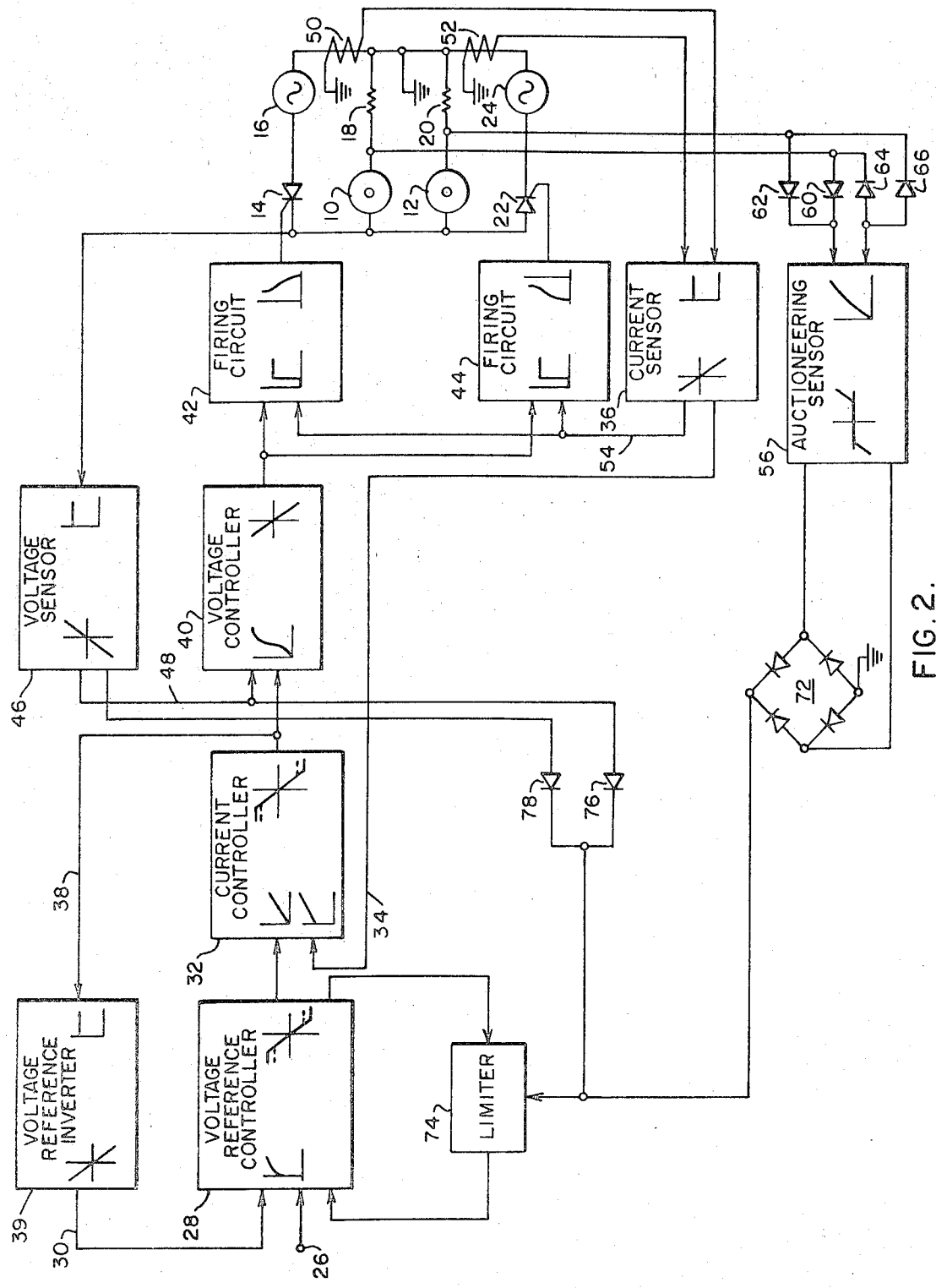
FIG. 2 is a block diagram of another embodiment of the invention which provides tapered current limit.

A system for providing such a tapered current limit is shown in FIG. 2 wherein elements corresponding to those shown in FIG. 1 are identified by like reference numerals. In this case, however, the output of the auctioneering sensor 56 is converted into a unidirectional signal in full-wave rectifier 72 and applied to a limiter 74 in a feedback loop for the voltage reference controller 28. Additionally, positive and negative signals derived from the voltage sensor 46 are applied through diodes 76 and 78 to the limiter 74. With this arrangement, as the current increases above a predetermined maximum value, the limiter 74 will reduce the saturation level at the output of the voltage reference controller 28. Similarly, as voltage increases in either the positive or negative direction, the same limiting action will occur, thereby achieving the tapered current limit as shown by broken line 70 in FIG. 3.

Although the present invention has been shown and described in connection with certain specific embodiments, it should be readily apparent to those skilled in this art that various changes in form and arrangement of parts may be made to suit requirements without departing from the spirit and scope of the present invention.

I claim:

1. In a motor control system for a plurality of direct current motors operative with a thyristor power supply, the combination of:

a voltage reference controller having an adjustable maximum output;

a current controller coupled to the output of said voltage reference controller;

thyristor-firing circuit means operative with said thyristor power supply and coupled to the output of said current controller;

auctioneering sensor means responsive to current flow through said motors for producing an output control signal when current through any one of said motors exceeds a predetermined maximum limit; and control means for applying said control signal to said voltage reference controller to control its maximum output.

2. The motor control system of claim 1, with the output of said current controller being fed back to the input of said voltage reference controller through a voltage reference inverter such that when the two inputs to the voltage reference controller do not cancel, the voltage controller amplifies the difference and its output increases.

3. The motor control system of claim 1, including a second voltage controller connected between said current controller and said thyristor firing circuit means.

4. The motor control system of claim 3, wherein the voltage across said motors is applied to the input of said second voltage controller through a voltage sensor.

5. The motor control system of claim 1, including current sensor means responsive to the current flowing through said motors for providing an output signal to said current controller.

6. The motor control system of claim 1, including a feedback loop for the voltage reference controller having a limiter circuit in said feedback loop, with the output of said auctioneering sensor being supplied to the input of said limiter circuit.

7. The motor control system of claim 6, including means for sensing motor voltage and with the output of said voltage sensing means being applied to the input of said limiter circuit whereby a predetermined current limit is achieved such that the maximum current to the motors decreases as motor voltage increases.

8. The motor control system of claim 6, including a full wave rectifier connected between said auctioneering sensor and said limiter circuit.